United States Patent [19]
Williamson

[11] Patent Number: 5,248,090
[45] Date of Patent: Sep. 28, 1993

[54] SELF-COMPENSATION HERBICIDE SPRAYER

[75] Inventor: John C. Williamson, Plant City, Fla.

[73] Assignee: Pro-Ag, Inc., Plant City, Fla.

[21] Appl. No.: 846,078

[22] Filed: Mar. 5, 1992

[51] Int. Cl.$^5$ .......................... B05B 1/20; B05B 1/28
[52] U.S. Cl. .................................. 239/168; 239/172; 239/288
[58] Field of Search ............ 239/168, 172, 288, 288.3, 239/288.5; 172/233, 234, 264

[56] References Cited

U.S. PATENT DOCUMENTS

| | | | |
|---|---|---|---|
| 1,462,861 | 7/1923 | Jordan . | |
| 2,583,897 | 1/1952 | Smeds | 172/234 |
| 3,038,665 | 6/1962 | Doerr | 239/288 X |
| 3,059,704 | 10/1962 | Kasatkin | 172/233 X |
| 3,445,961 | 5/1969 | Elsworth . | |
| 3,581,933 | 6/1971 | Reams . | |
| 3,683,547 | 8/1972 | Harden | 239/288 X |
| 3,977,605 | 8/1976 | Sheldon . | |
| 4,350,294 | 9/1982 | Gaspard . | |
| 4,353,505 | 10/1982 | Kinder . | |
| 4,650,124 | 3/1987 | Connaughty et al. | 239/168 X |
| 4,736,888 | 4/1988 | Fasnacht . | |
| 4,893,755 | 1/1990 | Keathley | 239/288 X |
| 5,139,200 | 8/1992 | Greimann et al. | 239/288.3 X |

FOREIGN PATENT DOCUMENTS

| | | | |
|---|---|---|---|
| 2651391 | 11/1976 | Fed. Rep. of Germany | 239/288.3 |
| 2608944 | 7/1988 | France | 239/288 |

Primary Examiner—Andres Kashnikow
Assistant Examiner—Kevin P. Weldon
Attorney, Agent, or Firm—Jacobson, Price, Holman & Stern

[57] ABSTRACT

A plurality of spray chambers are mounted on a boom secured to a three-point trailer hitch of a tractor. Controlled herbicide spraying of the unwanted growth which occurs in the furrows between dikes in fields of strawberries, lettuce, corn, tomatoes, onions, and other crops is achieved. Each spray chamber includes two overlapping sections which are movable towards and away from each other against the bias of springs so that varying widths of furrows between adjacent dikes are accommodated. In addition, an entire spray chamber is laterally adjustable to accommodate varying distances between adjacent furrows as is encountered due to "blow outs" of dikes due to over-watering or storm conditions to cause partial collapse of a dike.

17 Claims, 4 Drawing Sheets

SELF-COMPENSATION HERBICIDE SPRAYER

FIELD OF THE INVENTION

This invention relates to the field of herbicide sprayers for spraying a plurality of furrows between rows of plastic covered dikes so as to eradicate weeds growing between adjacent dikes. A plurality of spray chambers are mounted on an elongated boom secured to the rear of a tractor. Each spray chamber is compressible and laterally shiftable to accommodate differences in location and width of furrows located between adjacent rows of dikes.

BACKGROUND OF THE INVENTION

Various attempts have been made to control weeds and other unwanted growth which occurs in furrows between the dikes used for the growing of vegetables and fruits. These dikes usually are covered in plastic to limit the amount of unwanted growth on the dikes. The crops at the top of the dikes pass through slits in the plastic. The furrows between adjacent dikes are used for irrigation purposes and travel of farm equipment. Unwanted weeds grow in the furrows which compete with the food product for the nutrients and water contained in the soil.

In U.S. Pat. No. 3,581,993 to Reams, a foldable agricultural spray boom incorporates a hydraulic cylinder which causes the boom to unfold when actuated by the pressurized spray liquid. In the unfolded position, a valve establishes a fluid path through the cylinder to the boom spray nozzles.

U.S. Pat. No. 1,462,861 to Jordan and U.S. Pat. No. 4,353,505 to Kinder disclose crop sprayers with skirts to limit the spray or dust to a row of planted crops. The Kinder patent also discloses a drift-free spraying apparatus adapted for movement in connection with a vehicle and includes a spray bar mounted within a bottomless, rectangular, box-type housing in communication with a fluid pump and reservoir assembly, adapted for emitting fluid in a mist configuration upon the surface to be sprayed through nozzles provided in the spray bar.

U.S. Pat. No. 3,445,961 to Elsworth, U.S. Pat. No. 3,977,605 to Sheldon, U.S. Pat. No. 4,350,294 to Gaspard, and U.S. Pat. No. 4,736,888 to Fasnacht disclose herbicide sprayers for use in planted fields. These patents include various means for protecting the crops, either by carefully limiting the spread of the herbicide spray or by shielding the crops from the spray. In the Gaspard patent, spray nozzles are disclosed as being mounted on pivoting arms including a skid which runs along a furrow. This keeps the nozzle at a constant height and allows control of the spread of the herbicide without lateral control.

SUMMARY OF THE INVENTION

It is an object of the present invention to overcome the disadvantages encountered by the prior art.

By the present invention, a plurality of spray chambers are mounted on a boom secured to a three-point trailer hitch of a tractor. Controlled herbicide spraying of the unwanted growth which occurs in the furrows between dikes in fields of strawberries, lettuce, corn, tomatoes, onions, and other crops is achieved. Each spray chamber includes two overlapping sections which are movable towards and away from each other against the bias of springs so that varying widths of furrows between adjacent dikes are accommodated. In addition, an entire spray chamber is laterally adjustable to accommodate varying distances between adjacent furrows as is encountered due to "blow outs" of dikes due to over-watering or storm conditions to cause partial collapse of a dike.

By the present invention, the spray of herbicide is limited to vegetation located in the furrow between dikes so as to eliminate any accidental spraying of the adjacent crops located on top of the dikes. The present invention would avoid the drift of herbicide during high wind conditions which could accidentally kill the crops, and therefore spraying may occur at any time, avoiding the necessity to wait for good weather for herbicide spraying.

The boom onto which the plurality of spray chambers are mounted includes lift cylinders to elevate sections of the boom for higher speed travel when not spraying Each of the spray chambers includes a chain link connection to the boom at the rear of the spray chamber to limit the extent of drop of the spray chambers when lifting the boom sections. In addition, each spray chamber includes a slidable connection to the boom at the front of each spray chamber for a lateral adjustment of the spray chambers. The chain link connection also prevents excessive drop of the rear of the spray chambers when passing over a ditch caused by over-watering of the field, or other adverse conditions.

The lateral and height positioning of spray nozzles within each spray chamber are adjustable. By these adjustments, accurate herbicide spraying of the furrows of a field is accomplished.

It is therefore an object of the present invention to provide a self-compensating herbicide sprayer including a plurality of spray chambers mounted on a boom with each spray chamber being compressible to accommodate narrowed furrows and being slidably mounted to move laterally to compensate for varying distances between adjacent furrows.

It is yet another object of the present invention to provide a self-compensating herbicide sprayer including a plurality of spray chambers mounted on a boom with each spray chamber being compressible to accommodate narrowed furrows and being slidably mounted to move laterally to compensate for varying distances between adjacent furrows, with low friction slide strips being located at the bottom of each half of a spray chamber to move adjacent halves of each spray chamber toward each other in the event of encountering a narrowed furrow against a biased force for returning the compressed spray chamber to an original width after passage through a narrowed furrow section.

It is still yet another object of the present invention to provide a self-compensating herbicide sprayer including a plurality of spray chambers mounted on a boom with each spray chamber being compressible to accommodate narrowed furrows and being slidably mounted to move laterally to compensate for varying distances between adjacent furrows, with low friction slide strips being located at the bottom of each half of a spray chamber to move adjacent halves of each spray chamber toward each other in the event of encountering a narrowed furrow against a biased force for returning the compressed spray chamber to an original width after passage through a narrowed furrow section, with the spray chambers being mounted on a liftable boom and having a connection between the boom and the rear of each chamber to limit the extent of drop of each spray chamber during lifting of the boom.

It is still yet another object of the present invention to provide a self-compensating herbicide sprayer including a plurality of spray chambers mounted on a boom with each spray chamber being compressible to accommodate narrowed furrows and being slidably mounted to move laterally to compensate for varying distances between adjacent furrows, with low friction slide strips being located at the bottom of each half of a spray chamber to move adjacent halves of each spray chamber toward each other in the event of encountering a narrowed furrow against a biased force for returning the compressed spray chamber to an original width after passage through a narrowed furrow section, with the spray chambers being mounted on a liftable boom and having a connection between the boom and the rear of each chamber to limit the extent of drop of each spray chamber during lifting of the boom, and with each spray chamber including at least one spray nozzle which is laterally and height adjustable for controlled spraying of a furrow.

These and other objects of the invention, as well as many of the intended advantages thereof, will become more readily apparent when reference is made to the following description taken in conjunction with the accompanying drawings.

DETAILED DESCRIPTION OF THE PREFERRED EMBODIMENTS

Figure 1:
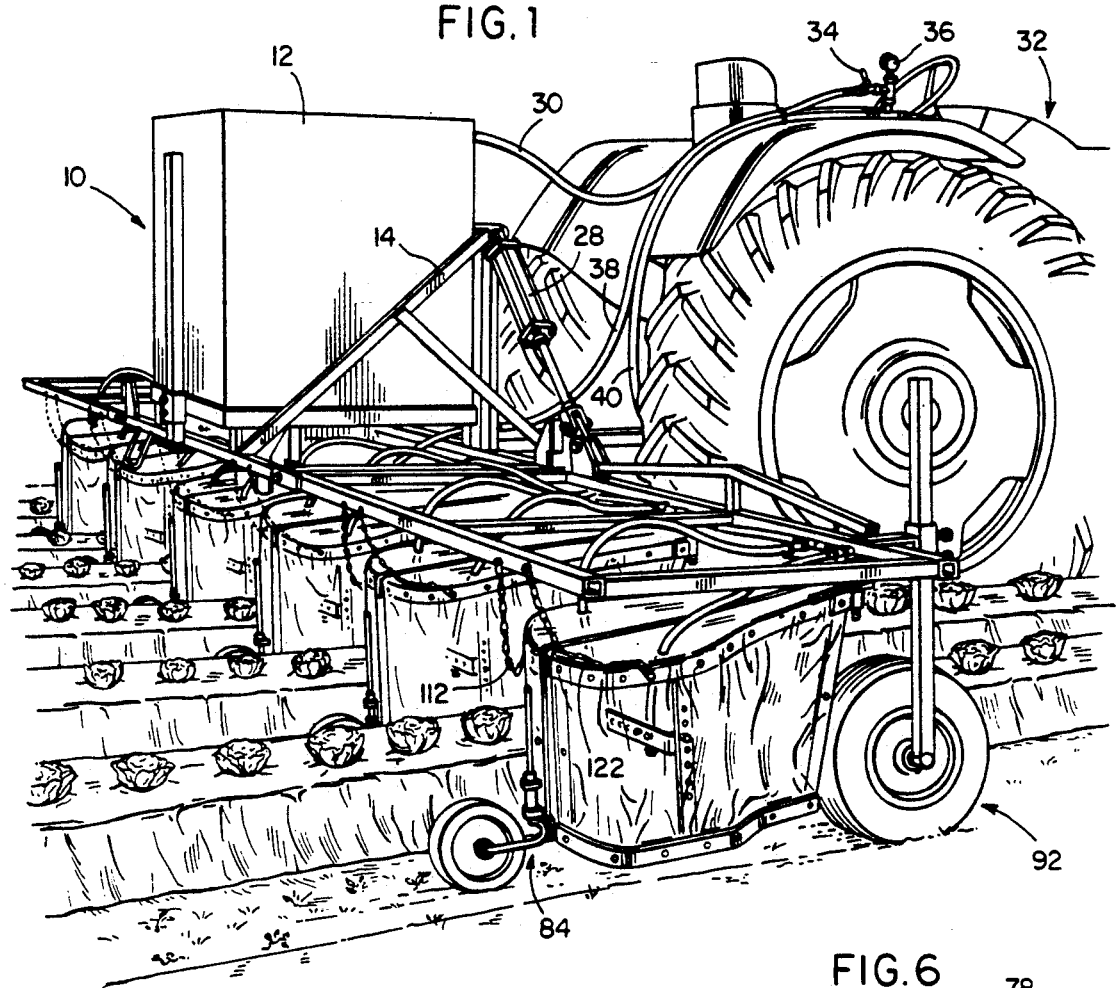
FIG. 1 is a perspective view of a tractor pulling a plurality of spray chambers mounted on boom sections having a central herbicide spray housing.

In describing the preferred embodiments of the invention illustrated in the drawings, specific terminology will be resorted to for the sake of clarity. However, the invention is not intended to be limited to the specific terms so selected, and it is to be understood that each specific term includes all technical equivalents which operate in a similar to accomplish a similar purpose.

With reference to the drawings, in general, and to FIG. 1, in particular, a self-compensating herbicide sprayer embodying the teachings of the subject invention is generally designated as 10. With reference to its orientation in FIG. 1, the self-compensating herbicide sprayer comprises a herbicide spray housing 12 mounted on a support structure 14 which includes a three point tractor hitch 16 as shown in phantom lines in FIG. 4.

Figure 2:
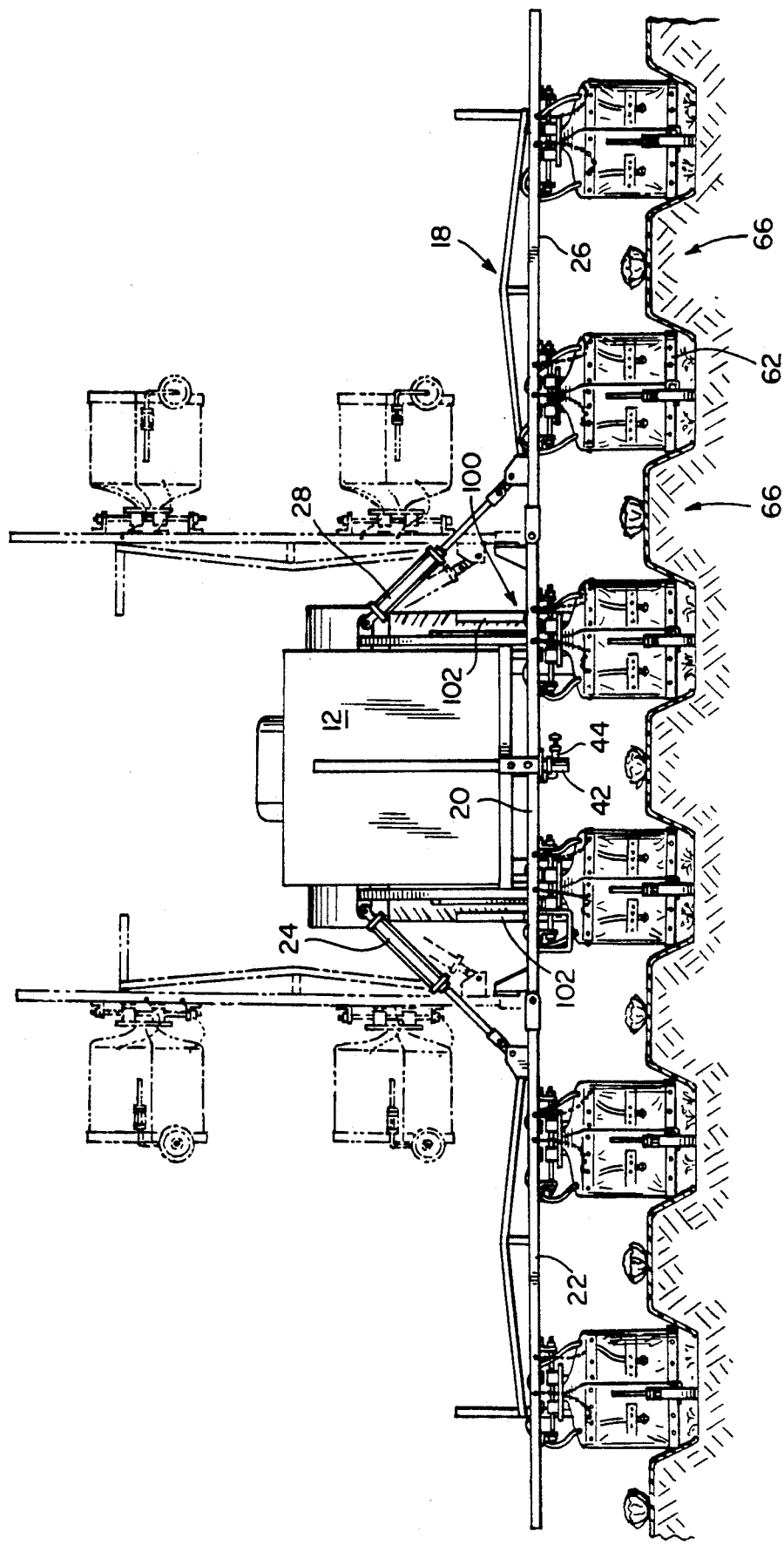
FIG. 2 is a rear elevational view of the spray chambers mounted on the boom sections in operational and elevated positions.

In FIG. 2, a boom 18 includes fixed boom section 20 secured to the support structure 14. Left boom section 22 is pivotally mounted to the support structure 14 by piston cylinder 24. Similarly, right boom section 26 is mounted to support structure 14 by piston cylinder 28.

Herbicide spray housing 12 includes a storage tank (not shown) for containing a herbicide to be sprayed as well as a spray motor (not shown) driven by a hydraulic control line 30 as controlled from tractor 32 by variable valve 34 based on a pressure read from gauge 36 by the operator of the tractor and as energized by the motor of the tractor 32. The operator is thereby able to control spray pressure while driving the tractor.

Spray lines 38 and 40 provide the herbicide to the left and right sides of the boom, as will be explained in more detail later. A hose 42 having valve is used for draining of the herbicide from the herbicide spray housing.

Figure 3:
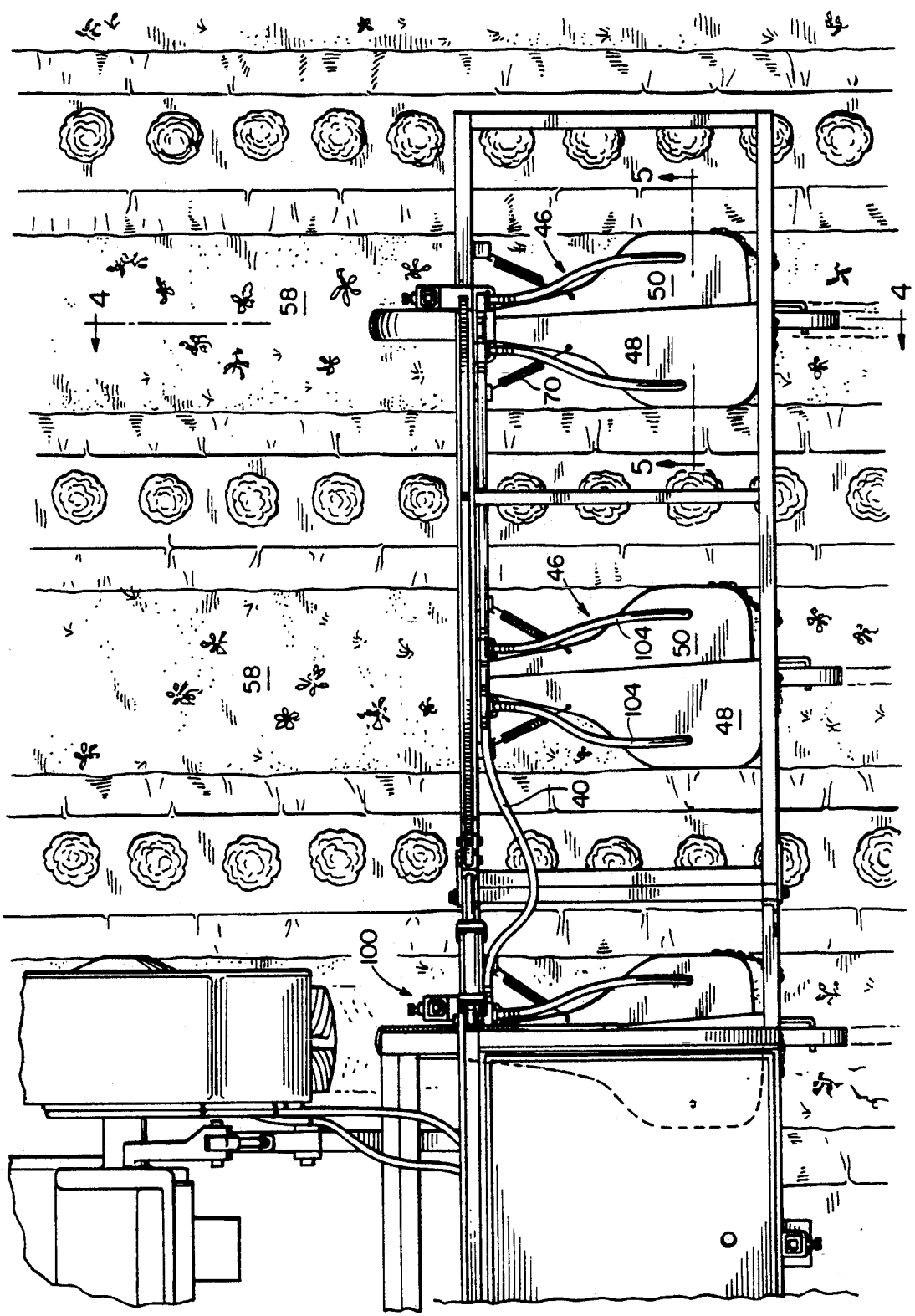
FIG. 3 is a plan view illustrating a plurality of spray chambers mounted on a boom section.

With reference to FIG. 3, mounted on right boom section 26 are two spray chambers 46 which are identical in structure. Similarly, two spray chambers 46 are mounted on left boom section 22. Also, two spray chambers 46 are mounted on fixed boom section 20.

Figure 6:
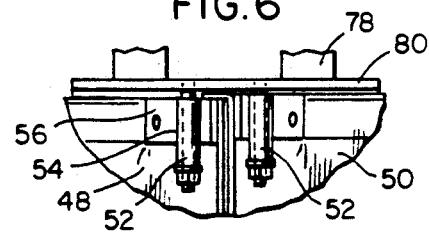
FIG. 6 is a detailed view of the pivots for movement of spray chamber portions towards and away from each other.
Figure 5:
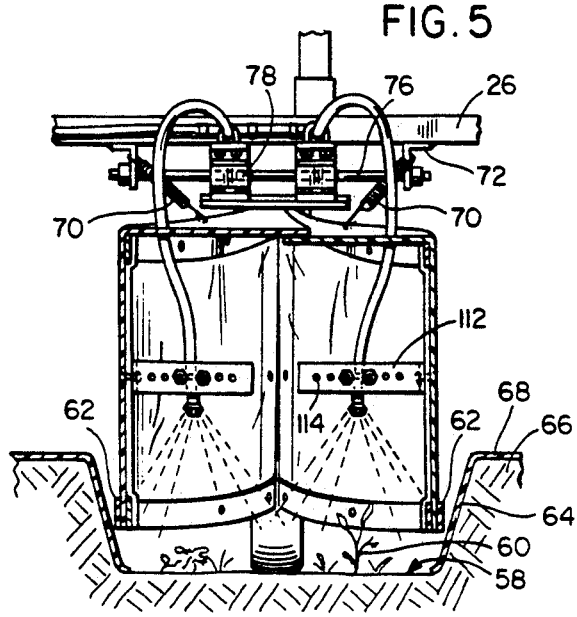
FIG. 5 is a cross-sectional view taken along line 5—5 of FIG. 3.

Each spray chamber includes a left and right spray chamber housing sections 48 and 50. The two spray housing sections 48 and 50 are pivotally mounted as shown in FIG. 6 to a respective bolt 52 which extends through a sleeve 54 secured by bracket 56 to a respective one of the spray chamber housing sections 48, 50. The bolts are fixed to bar 80 so that the two spray chamber housing sections are pivotally mounted for movement towards and away from each other.

As the spray chambers move down along a furrow 58 including weeds 60, a bottom edge strip 62 made of a low friction material, such as material manufactured with a coating distributed under the trademark TEFLON, encounter the side wall 64 of a dike 66. The dikes are covered in a plastic material 68 to limit a growth of weeds on the dike.

The contacting of the strips 62 with the side walls 64 of the dikes where the width of the dikes is less than a predetermined width, such as, for example, less than 17 inches wide, or other appropriate field set width, causes the pivoting of spray chamber housing sections 48, 50 towards each other. The narrowing of the furrows 58 may be caused by over-watering or other soil erosion factors which causes partial collapse of a dike.

Figure 7:
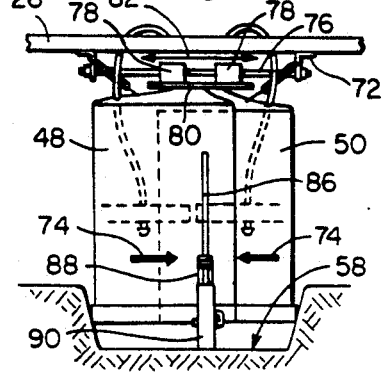
FIG. 7 is a detailed view of the lateral shifting of a spray chamber mounted on a boom section.

When the strip 62 encounters the side walls 66 of the narrowed furrow 58, the spray chamber housing sections pivot inwardly towards each other against the bias force of restraining springs 70 as secured at one end to the spray chamber housing sections and secured at the other end to brackets 72 mounted on the boom section. As shown in FIG. 7, and illustrated by arrows 74, spray chamber housing section 50 slides within and under the top of spray chamber housing section 48.

Therefore, after passage of a spray chamber through a narrowed furrow section, the bias of the spring 70 causes the spray chamber housing sections to move outwardly away from each other as pivoted around bolt 52 to return to their normal position of operation.

When a shift in spacing between adjacent furrows 58 occurs, each spray chamber is laterally adjustable to compensate for the change in spacing. As shown in FIG. 7, a hardened steel rod 76 is fixedly mounted to the boom section 26 by brackets 72. Lineal bearings 78 are slidably mounted to a bar 80 to which the spray chamber housing sections 48 and 50 are secured by bolts 52. The lineal bearings allow lateral shifting of the spray chambers 46 in the directions of arrow 82 to compensate for a change in the spacing between adjacent furrows. If there is a shift in the furrow spacing over the spacing for which adjacent spray chambers 46 were originally set, the lineal bearings 78 will allow a lateral shift of individual spray chambers, with springs 72 returning a laterally moved spray chamber to its original position after passage of a shifted furrow portion.

Each spray chamber includes a caster wheel assembly 84 mounted onto the spray chamber housing section 48. A shaft 86 passes through a bearing 88 fixes the height of the wheel 90 travelling along the furrow 58. The bearing includes a stop nut 85 to adjust the height of each wheel 87 to change a distance between the bottom of each spray chamber with respect to the bottom of the furrow.

In addition, wheel assembly 92 mounted on each boom section 22, 26 includes a shaft 94 passing through a bracket 96 having set screws 98 for vertical adjustments of the shafts 94 and thereby changing the height of the boom sections 22, 26 with respect to the ground. Similar wheel assemblies 100 are located on the central boom section 20 with shafts 102 shown to accommodate vertical positioning of the central boom section similar to the positioning of the left and right boom sections 22 and 26, respectively.

For control of herbicide spray only into the furrow, each spray chamber includes two spray lines 104 extending from either spray line 40 for the right side of the herbicide sprayer or spray line 38 for the left side of the herbicide sprayer. Each spray chamber housing section 48, 50 includes a spray line 104.

Figure 4:
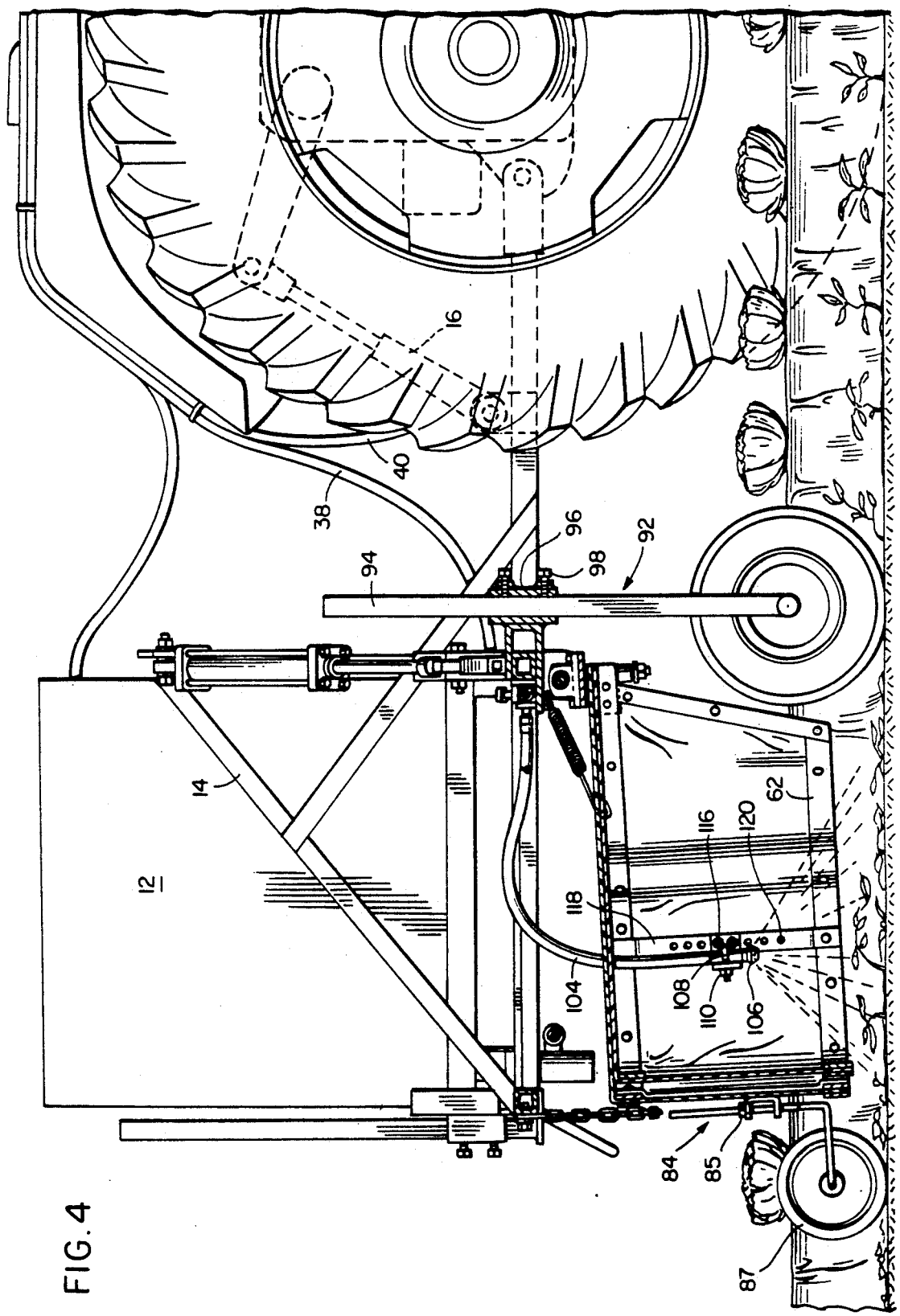
FIG. 4 is a cross-sectional view taken along line 4—4 of FIG. 3.

As shown in FIG. 4, spray line 104 includes a spray nozzle 106 at its terminal end. The nozzle 106 is clamped by a U-shaped bracket 108, secured by nuts 110 to a flange 112. The flange 112 includes a plurality of holes 114 for lateral adjustment of the positioning of the spray nozzle 106 within a respective spray chamber housing section 48 or 50. In addition, the flange 112 is secured by a nut and bolt assembly 116 to a vertical extending strip 118 having a plurality of holes 120 for the vertical positioning of the strip 112 so as to raise or lower the spray nozzle 106.

In the event that a ditch is encountered in a single furrow, a chain 122 extends between a spray chamber and a bar of the boom section to which the respective spray chamber is mounted so that the descent of the spray chamber is limited to the extent of slack included in the chain 122. This avoids damage to the spray chamber and with respect to the spray chambers adjacent to a wheel assembly 92, avoids contact with the wheel assembly to avoid damage to the spray chamber.

Also, when piston cylinders 24, 28 are energized to move the boom sections 22 or 26 into an upright vertical position, as shown in dotted lines in FIG. 2, chains 122 limit the extent to which the spray chambers will move downwardly away from the boom sections during ascent. When the boom sections are fully vertical the chains limit the extent to which the spray chambers will move vertically downward to avoid damage of the spray chambers.

By the present invention, increased spraying capacity is achieved at a quicker operating time due to the number of spray chambers securable to a tractor and which are laterally adjustable as an entire unit or compressible for passage through a decreased width furrow. The use of a lineal bearing allows sliding of the spray chambers to accommodate different widths between adjacent furrows. Lineal bearings operate without ball bearings, and therefore avoid the problems encountered by other farm machinery using ball bearings which tend to freeze up due to exposure of harsh chemicals as are used in herbicides.

Having described the invention, many modifications thereto will become apparent to those skilled in the art to which it pertains without deviation from the spirit of the invention as defined by the scope of the appending claims.

I claim:

1. A herbicide spray apparatus for mounting on a tractor, said herbicide spray apparatus comprising:
   a boom,
   a plurality of spray chambers mounted on said boom,
   each of said plurality of spray chambers being laterally shiftable with respect to said boom and with respect to each other, and
   each of said plurality of spray chambers including spray chamber housing sections being movable towards and away from each other,
   said spray chamber housing sections being biased to move away from each other after moving towards each other.

2. A herbicide spray apparatus as claimed in claim 1, wherein said spray chambers include mounting means for mounting said spray chambers on said boom, said mounting means allowing the lateral shifting of said spray chambers with respect to said boom and with respect to each other and allowing said spray chamber housing sections to move towards and away from each other.

3. A herbicide spray apparatus as claimed in claim 1, wherein said spray chambers include a low friction strip for engaging side walls of a dike as the spray chambers move through respective furrows.

4. A herbicide spray apparatus as claimed in claim 1, wherein said boom includes a plurality of sections.

5. A herbicide spray apparatus as claimed in claim 4, wherein at least one boom section is fixed and at least one boom section is movable with respect to said at least one fixed boom section.

6. A herbicide spray apparatus as claimed in claim 1, wherein said spray chambers include at least one spray nozzle located within said spray chambers.

7. A herbicide spray apparatus as claimed in claim 6, wherein a position of said at least one spray nozzle is adjustable.

8. A herbicide spraying apparatus for mounting on a tractor to spray furrows between adjacent dikes as the tractor travels through a field, said herbicide spraying apparatus comprising:
   an elongated boom,
   a plurality of spray chambers mounted on said elongated boom and spaced along a length of said elongated boom,
   mounting means for mounting said plurality of spray chambers on said elongated boom, and
   said mounting means shifting each of said spray chambers with respect to said elongated boom and with respect to other spray chambers when one said spray chamber encounters a furrow having a spacing with respect to an adjacent furrow different from a spacing between other furrows and said mounting means lessening an overall width of one said spray chamber when said one spray chamber encounters a furrow having a width less than a predetermined width,
   said mounting means including a rod secured to said elongated boom, a bearing slidably mounted on said rod, and spray chamber housing sections of each spray chamber being pivotally mounted on a bar connected to said bearing.

9. A herbicide spray apparatus as claimed in claim 8, wherein said spray chamber housing sections are biased to move away from each other after moving towards each other.

10. A herbicide spray apparatus as claimed in claim 8, wherein said spray chambers include a low friction strip for engaging side walls of a dike as the spray chambers move through respective furrows.

11. A herbicide spray apparatus as claimed in claim 8, wherein said boom includes a plurality of sections.

12. A herbicide spray apparatus as claimed in claim 12, wherein at least one boom section is fixed and at least one boom section is movable with respect to said at least one fixed boom section.

13. A herbicide spray apparatus as claimed in claim 8, wherein said spray chambers include at least on spray nozzle located within said spray chambers.

14. A herbicide spray apparatus as claimed in claim 13, wherein a position of said at least one spray nozzle is adjustable.

15. A herbicide spraying apparatus for mounting on a tractor to spray furrows between adjacent dikes as the tractor travels through a field, said herbicide spraying apparatus comprising:

an elongated boom, a plurality of spray chambers mounted on said elongated boom and spaced along a length of said elongated boom, mounting means for mounting said plurality of spray chambers on said elongated boom, said mounting means shifting each of said spray chambers with respect to said elongated boom and with respect to other spray chambers when one said spray chamber encounters a furrow having a spacing with respect to an adjacent furrow different from a spacing between other furrows and said mounting means lessening an overall width of one said spray chamber when said one spray chamber encounters a furrow having a width less than a predetermined width, and spray chamber housing sections of each spray chamber being biased to move away from each other after moving towards each other.

16. A herbicide spray apparatus as claimed in claim 14, wherein said spray chambers include a low friction strip for engaging side walls of a dike as the spray chambers move through respective furrows.

17. A herbicide spray apparatus as claimed in claim 14, wherein at least one boom section is fixed and at least one boom section is movable with respect to said at least one fixed boom section.

* * * * *